United States Patent
Suzuki et al.

(10) Patent No.: US 6,639,181 B2
(45) Date of Patent: Oct. 28, 2003

(54) APPARATUS AND METHOD FOR ASSESSING ELECTRODE TIP WEAR

(75) Inventors: Yukimitsu Suzuki, Aichi-ken (JP); Koji Onishi, Aichi-ken (JP)

(73) Assignee: Central Motor Wheel Co., Ltd., Aichi-ken (JP)

( * ) Notice: Subject to any disclaimer, the term of this patent is extended or adjusted under 35 U.S.C. 154(b) by 0 days.

(21) Appl. No.: 10/064,715

(22) Filed: Aug. 9, 2002

(65) Prior Publication Data

US 2003/0029851 A1 Feb. 13, 2003

(30) Foreign Application Priority Data

Aug. 10, 2001 (JP) ........................................ 2001-243655

(51) Int. Cl.[7] ................................................. B23K 9/10
(52) U.S. Cl. ................................................. 219/130.01
(58) Field of Search .................... 219/130.01, 130.21, 219/130.31, 130.32, 130.33

(56) References Cited

U.S. PATENT DOCUMENTS 5,221,825 A * 6/1993 Siewert et al. ......... 219/130.01
6,130,407 A * 10/2000 Villafuerte ............. 219/130.01

FOREIGN PATENT DOCUMENTS

| JP | 8-318372 | * | 12/1996 |
| JP | 2000-24779 | * | 1/2000 |

* cited by examiner

*Primary Examiner*—Clifford C. Shaw
(74) *Attorney, Agent, or Firm*—Jiang Chyun IP Office

(57) ABSTRACT

Welding voltage and welding current supplied to a workpiece from a welding wire 3 of a consumable electrode gas shielded arc welding apparatus are detected by a welding voltage detection means 11 and a welding current detection means 12. A replacement index for an electrode tip 5 is computed by a replacement index computation means 13, based on the average values of the welding voltage and welding current during arc time. A wear assessment means 14 assesses the state of wear of the electrode tip 5 by comparing the replacement index to a prescribed reference value. When the electrode tipreaches its prescribed wear limit (when its replacement index reaches the prescribed reference value), this fact is indicated by a replace tip indicator means 15.

2 Claims, 8 Drawing Sheets

Tip replacement index Wv={(Va/Val)-1}*K

Va;Instant average arc-time welding voltage
Val;Average arc-time welding voltage after tip replacement
K;Constant Tip replacement index $W = \{(Ia/Ia1)-1\} * K$ Ia;Instant average arc-time welding current
Ia1;Average arc-time welding current after tip replacement
K;Constant

APPARATUS AND METHOD FOR ASSESSING ELECTRODE TIP WEAR

CROSS REFERENCE TO RELATED APPLICATIONS

This application claims the priority benefit of Japan application serial No. 2001-243655, filed on Aug. 10, 2001.

BACKGROUND OF INVENTION

1. Field of the Invention

The present invention is related to an apparatus and method for assessing the state of wear of electrode tips used in consumable electrode gas shielded arc welding.

2. Description of Related Art

In consumable electrode gas shielded arc welding, an "electrode tip" has a consumable electrode (hereinafter, "welding wire") inserted through it in a manner such that there is electrical contact between the wire and the tip. Electrical power is then supplied to the welding wire through the electrode tip. The wire is fed through a hole in the electrode tip, causing the hole to wear. This wear progresses over time, causing the points of contact between the wire and the electrode tip (the points through which power is supplied) to shift, which in turn results in fluctuations in the state of the electrical power supplied to the wire. This causes arc instability phenomena to occur during welding.

Therefore, to keep the electrical power supply points stable and maintain good weld quality, electrode tips must be replaced when they become too worn. In the past, this tip replacement was performed either whenever deemed necessary by an equipment operator, based on his experience in visual observation of arc instability, or periodically, based on the accumulated operating time of the tip.

An apparatus and method for automatically assessing electrode tip wear in consumable electrode gas shielded arc welding was proposed in Japanese Publication of Unexamined Patent Application (hereinafter "pre-grant publication") No. H8-318372 (hereinafter, "the first background art reference"). In this method, electrode tip wear was assessed by detecting welding wire feed motor load current and weld current, and comparing variations in these two currents with their respective wear assessment threshold values.

Another method and apparatus for determining when an electrode tip had reached its wear limit was proposed in Japanese Pre-grant Publication No. 2000-24779 (hereinafter, "second background art reference"). In this method, variations in welding current or welding voltage were sensed, and it was deemed that the electrode tip had reached its wear limit when the variations met prescribed conditions.

In the technology of the first background art reference, a key factor in the assessment of electrode tip service life was the maximum amplitude of weld current variations over a specific time period. In reality, however, in most cases, however, the maximum amplitude was simply the difference between the high current that occurs during the short-circuit time, and the minimum current. Therefore, in this technology, although it was possible to assess welding instability caused by an electrode tip at its wear limit, it was difficult to determine the optimum tip replacement timing. In other words, the system might indicate that replacement was required for an electrode tip that was still useable.

In the method described in the second background art reference, a decision that a tip was at the end of its service life was made when the welding voltage or current met prescribed conditions. Since most of the variations in welding current and voltage occur during the short-circuit time, however, it was inevitable that tip wear assessments would be heavily influenced by the short-circuit voltage or current. As was the case for the method of the first background art reference, then, although it was possible in this method to assess welding instability caused by an electrode tip at its wear limit, it was difficult to determine the optimum timing for tip replacement. Accordingly, in this method as well, the system might indicate that replacement was required for an electrode tip with useful service life remaining.

In other words, inherent in the methods of the above first and second background art references was always the possibility that a false indication of an electrode tip at the end of its service life might be caused by welding instability, irrespective of the amount of actual tip wear.

SUMMARY OF INVENTION

The present invention is directed to an apparatus and method to solve this problem. It is an object of the present invention to provide an apparatus and method for assessment of electrode tip wear that can perform accurate quantitative assessment of the state of wear of an electrode tip, thereby to provide a precise assessment as to the optimum timing for electrode tip replacement. This object is achieved through the technology described below.

That is, to accomplish the above object, an apparatus for assessing electrode tip wear according to one aspect of the present invention is characterized in that, in consumable electrode gas-shielded arc welding, wherein a welding voltage is applied to an electrode tip having a wire inserted therein in electrical contact therewith, for performing arc welding by causing droplets to be transferred from the welding wire onto a workpiece to be welded, it comprises: a welding voltage detection means, or a welding current detection means, for detecting welding voltage applied between the welding wire and the workpiece, or the welding current supplied; a replacement index computation means for computing an electrode tip replacement index based on the average value of the arc-time welding voltage, or arc-time welding current, as detected by the welding voltage detection means or welding current detection means; and a wear assessment means for assessing the state of wear of the electrode tip by comparing the replacement index computed by the replacement index computation means with a reference standard value. It is to be noted here that the terms arc-time welding voltage" and "arc-time welding current" in the above description (and in the following) refer to that portion of the welding voltage and welding current that does not occur during the short-circuit time.

In the above assessment apparatus, an electrode tip replacement index is computed by the replacement index computation means, based on the average value of the arc-time welding voltage or arc-time welding current as detected by the welding voltage or welding current detection means. The wear assessment means then compares the computed replacement index value with a reference standard value, thus to provide a precise assessment as to the state of wear of the electrode tip.

It has been shown that as the accumulated time of use of an electrode tip for arc welding (accumulated operating time) increases, and the wear of the tip progresses, the average value of the arc-time welding voltage or arc time welding current, which is used to perform assessments, changes (see FIG. 5 and FIG. 6). It is this relationship that makes quantitative assessment of electrode tip wear possible. In addition, the welding voltage/current during arc-time is extremely stable in comparison to the welding voltage/current during the short-circuit time, and is subjected to few external disturbance factors other than electrode tip wear. This makes it possible to perform highly precise, quantitative assessment of electrode tip wear, and of the optimum tip replacement timing.

Also, according to another of the present invention, a method for assessing electrode tip wear in consumable electrode gas-shielded arc welding, wherein a welding voltage is applied to an electrode tip having a wire inserted therein in electrical contact therewith, for performing arc welding by causing droplets to be transferred from the welding wire onto a workpiece to be welded, is characterized in that it comprises: a step of detecting welding voltage applied between the welding wire and the workpiece, or welding current supplied; a step of computing an electrode tip replacement index based on the quotient of the instant average arc-time welding voltage, or arc-time welding current, divided by the average arc-time welding voltage, or arc-time welding current, respectively, immediately following tip replacement; and a step of assessing the state of wear of the electrode tip by comparing the value of the replacement index computed by the replacement index computation means with a prescribed assessment threshold value.

According to the assessment method as described above, an electrode tip replacement index is computed, based on the quotient of the instant average arc-time welding voltage, or arc-time welding current, divided by the average arc-time welding voltage, or arc-time welding current, respectively, immediately following tip replacement, and an assessment is performed by comparing the value of this computed replacement index to an assessment threshold value (which is set to a value at which it has been determined in advance that electrode tip replacement will be necessary). This makes it possible to provide a precise assessment of optimum electrode tip replacement timing.

BRIEF DESCRIPTION OF DRAWINGS

These and other features, aspects, and advantages of the present invention will become apparent with reference to the following description, claims, and accompanying drawings, where:

DETAILED DESCRIPTION

The best mode for carrying out the present invention is described in detail below, with reference to FIG. 1 through FIG. 7.

Figure 1:
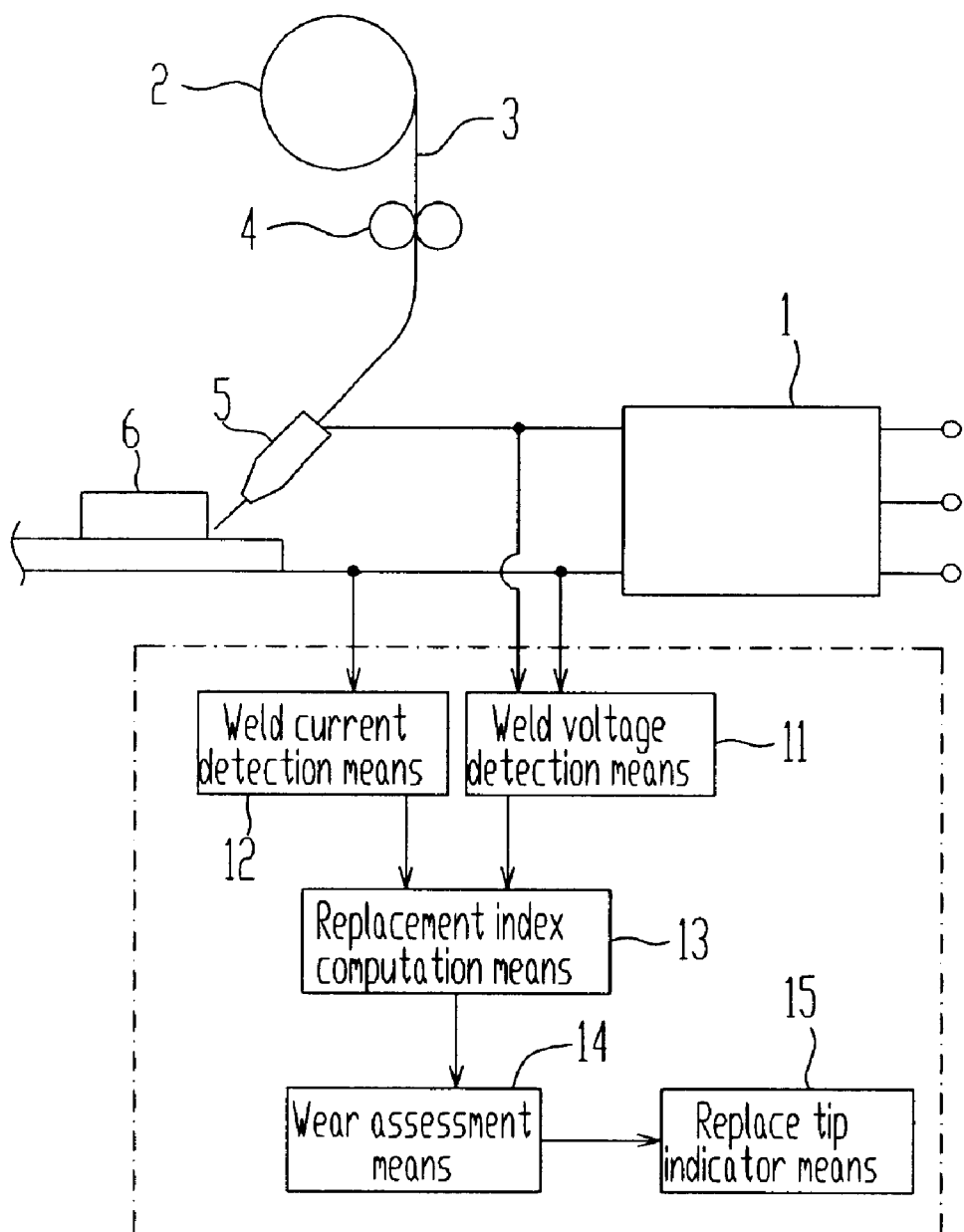
FIG. 1 is a block diagram showing the overall configuration of an arc welding system that includes the assessment apparatus of the present invention.

FIG. 1 is a block diagram showing the overall configuration of a consumable electrode gas shielded arc welding system (hereinafter, "arc welding system"), including the assessment apparatus of the present invention. As shown in FIG. 1, the system comprises a welding power supply 1; a takeup reel 2 around which a welding wire 3 is wound for containment thereon; a feed roller 4 for feeding welding wire 3 toward a welding workpiece 6; and an electrically conductive electrode tip 5 for holding the forward end of the welding wire 3, and supplying electrical power from the welding power supply 1 to the welding wire 3.

Figure 2:
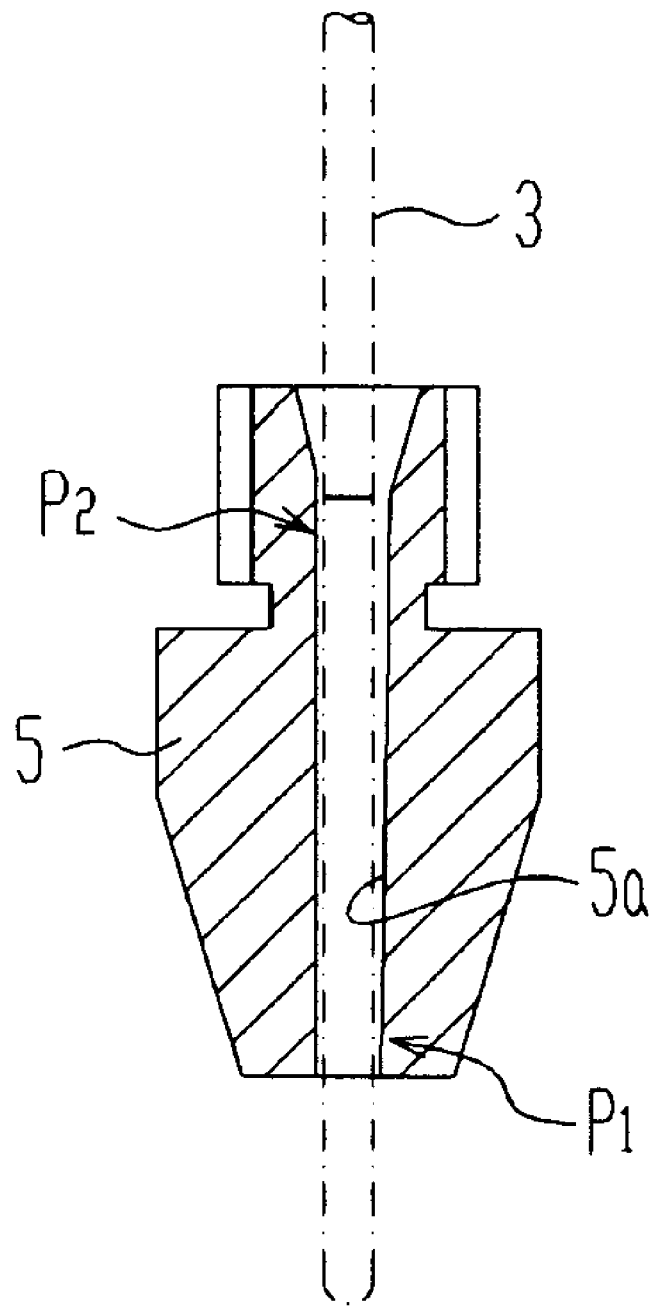
FIG. 2 is a cross-section view of an example of an electrode tip shown in FIG. 1.

As shown in FIG. 2, a through-hole 5a, through which the welding wire 3 is passed, is provided within the electrode tip 5. Normally, the outer surface of the welding wire 3 makes electrical contact with two contacts (P1 and P2) provided on the inside surface of the through-hole 5a, near its two ends. These two contacts (P1 and P2) are the electrical power supply points for the welding wire 3.

Also shown in FIG. 1 are a welding voltage detection means 11 for detecting welding voltage applied between the welding wire 3 and the welding workpiece 6, and a welding current detection means 12, for detecting welding current supplied from the welding wire to the welding workpiece 6. A replacement index computation means 13 computes a replacement index (hereinafter "tip replacement index,") to be described later, based on the arc-time welding voltage and arc-time welding current detected by these two detection means (11 and 12). The tip replacement index thus computed is used by an electrode tip wear assessment means 14 to perform wear assessment. If the assessed wear value exceeds a reference standard value, a "replace tip" indication is displayed by a replace tip indicator means 15.

Figure 3:
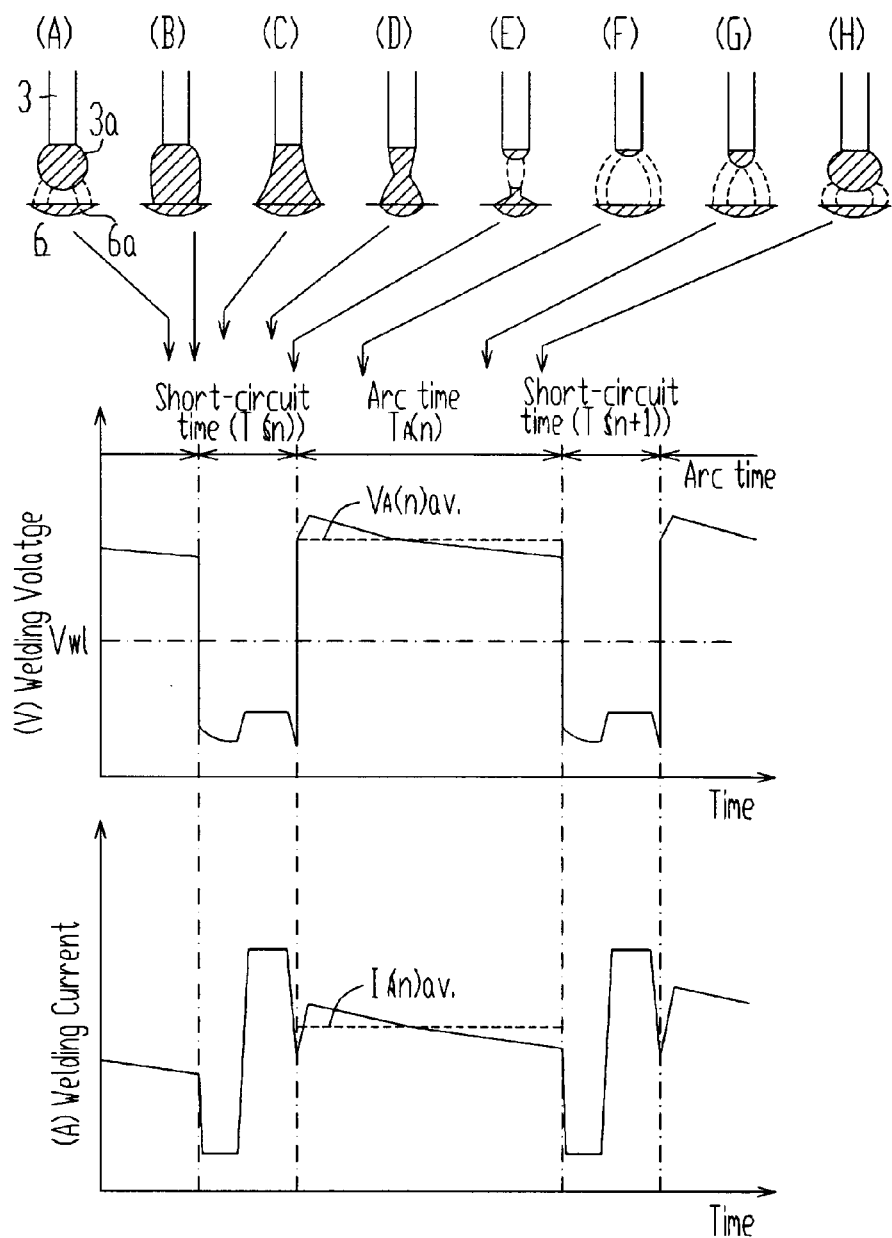
FIG. 3 shows how various arc welding operating states are related to voltage and current waveforms detected by a welding voltage detection means and a welding current detection means.

Arc-time welding voltage and arc-time welding current can easily be detected by setting a prescribed voltage threshold to a level that will filter out the short-circuit time voltage and current waveforms from the continuously detected welding voltage and welding current waveforms. FIG. 3 shows a typical example of the voltage and current waveforms detected by the welding voltage detection means 11 and welding current detection means, and the corresponding droplet-transfer phenomena that occur in the arc welding process. Over one short-circuit-and-arc cycle going from (A) to (H) in FIG. 3, when welding voltage is applied between the welding wire 3 and the workpiece and welding current supplied, the tip of the welding wire 3 and the workpiece 6 are melted by the heat of the arc discharge, forming both a droplet 3a at the wire, and a molten pool 6a at the workpiece. The droplet 3a then extends into the molten pool 6a to form a "bead" of weld metal. The variations in welding voltage and welding current during this time are as shown in the upper and lower waveforms in FIG. 3.

As shown in FIG. 3, an abrupt change in welding voltage occurs at the transition from arc time to short-circuit time, and at the transition from short-circuit time to arc time. Therefore, by using a threshold setting means to set an arc-time/short-circuit-time decision voltage ($V_{W1}$ in FIG. 3) as reference voltage, to sharply distinguish between the arc time and short-circuit time, the short-circuit-time waveform $T_{S(n)}$, $T_{S(n+1)}$ (the portions below the reference voltage) can be removed. This function is performed by a short-circuit waveform removal means (not shown). In FIG. 3, $T_{S(n)}$ is the short-circuit time of the $n^{th}$ cycle, $T_{A(n)}$ is the arc time of the $n^{th}$ cycle, and $T_{S(n+1)}$ is the short-circuit time of the $(n+1)^{th}$ cycle. Similarly, $V_{A(n)av.}$ is the average arc-time welding voltage of the $n^{th}$ cycle, and $I_{A(n)av.}$ is the average arc-time welding current of the $n^{th}$ cycle.

Figure 4:
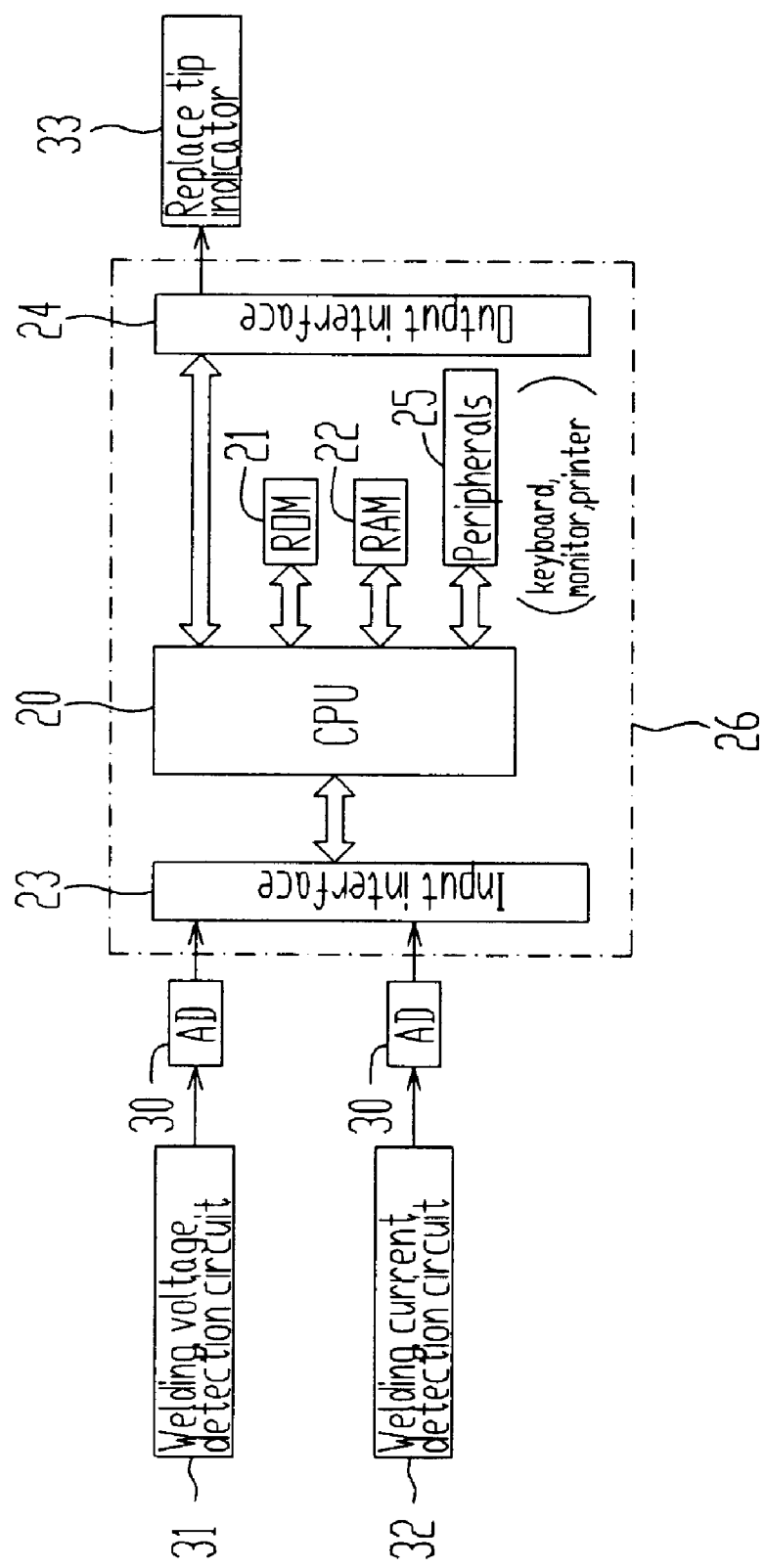
FIG. 4 is a block diagram of the basic circuit of the assessment apparatus of FIG. 1.

The basic circuit of the assessment apparatus in the arc welding system described above will now be described with reference to the block diagram of FIG. 4. As shown in FIG. 4, the assessment apparatus circuit includes a processor (CPU) 20, a memory (ROM)memory (RAM)an input interface 23, an output interface 24, and peripherals (keyboard, monitor, printer, etc.) 25 (all of the above items being included in a controller 26), an A/D converter 30, a welding voltage detection circuit 31, a welding current detection circuit 32, and a tip replacement indicator unit 33.

Stored in the ROM memory 21 is a program (assessment program) providing a number of processes (included in a flow chart to be discussed later) required to assess electrode tip wear. The assessment program executes whenever the processor is 20 is started up. Variable data required to run the assessment program is temporarily stored in the RAM memory 22.

Once per given cycle, average values of arc-time welding voltage and welding current are output from the two detection circuits 31 and 32, through the A/D converters 30, and input interface 23, for input to the processor 20. The processor 20 computes a tip replacement index, and if the value of that index exceeds a reference standard value, a signal is output through the output interface 24 to the tip replacement indicator unit 33, which responds by producing a "replace tip" indication, such as a flashing lamp.

Figure 5:
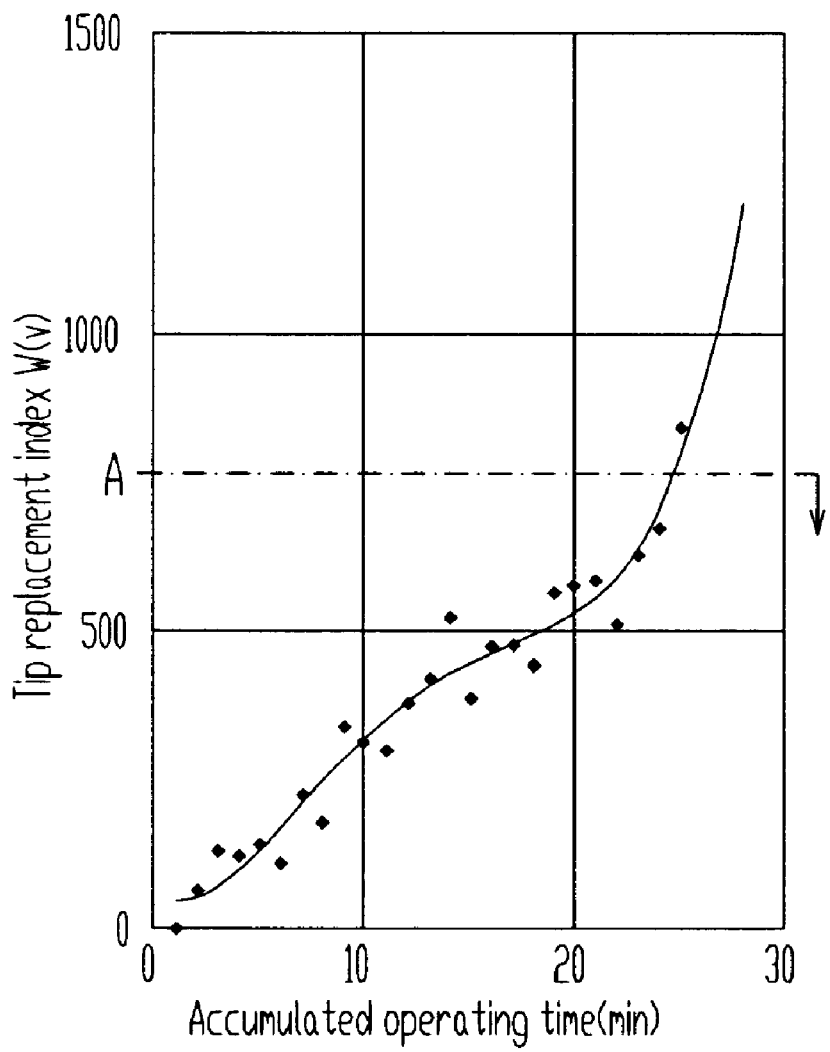
FIG. 5 is a graph showing the relationship between accumulated operating time, and a tip replacement index based on average values of arc-time welding voltage obtained experimentally.
Figure 6:
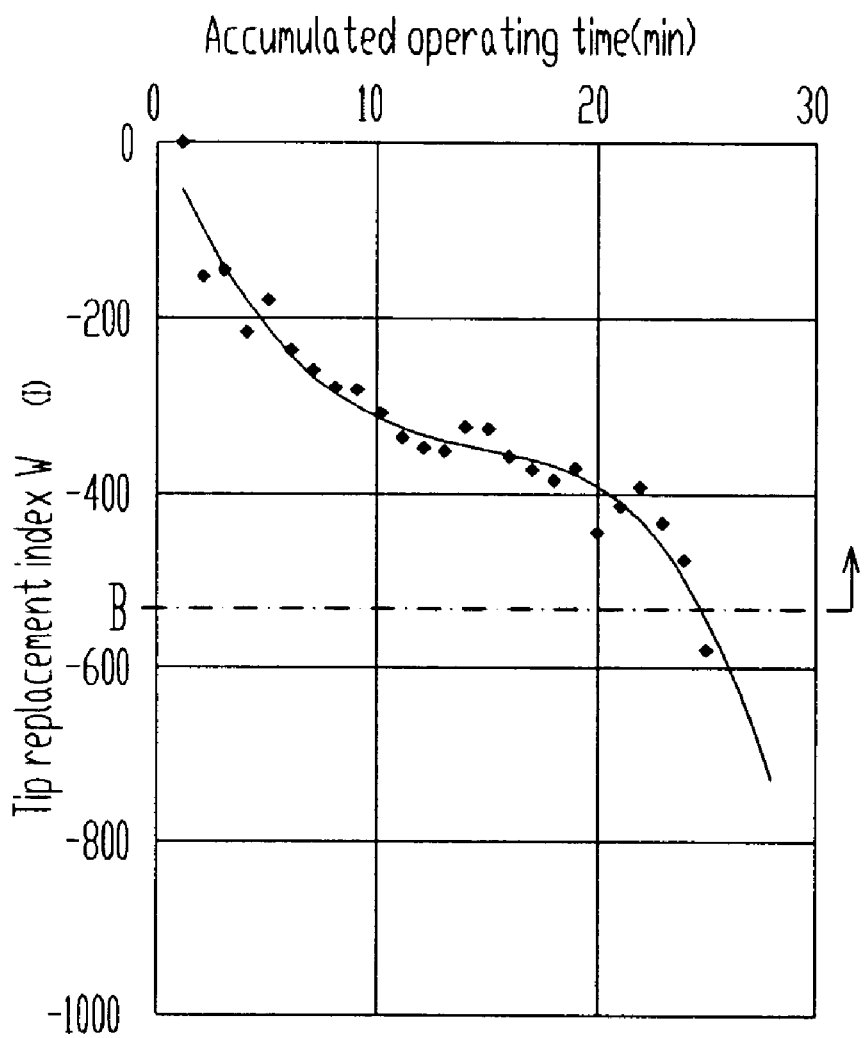
FIG. 6 is a graph showing the relationship between accumulated operating time, and a tip replacement index based on average values of arc-time welding current obtained experimentally.

FIG. 5 and FIG. 6 show results obtained in an experiment conducted to determine the relationship between the accumulated arc welding operation time of the tip, and the tip replacement index. The tip replacement index plotted in FIG. 5 is based on the quotient of the instant average arc-time welding voltage ($V_a$) divided by the average arc-time welding voltage immediately following electrode tip replacement ($V_{a1}$), as given by the following equation:

$$\text{Tip replacement index } W_I = \{(V_a/V_{a1})1\} \times K \quad (1)$$

where
  $V_a$ is the instant average arc-time welding voltage,
  $V_{a1}$ is the average arc-time welding voltage after tip replacement, and
  K is a constant.

The tip replacement index plotted in FIG. 6 is based on the quotient of the instant average arc-time welding current ($I_a$) divided by the average arc-time welding current immediately following electrode tip replacement ($I_{a1}$), as given by the following equation:

$$\text{Tip replacement index } W_I = \{(I_a/I_{a1})1\} \times K \quad (2)$$

where
  $I_a$ is the instant average arc-time welding current,
  $I_{a1}$ is the average arc-time welding current after tip replacement, and
  K is a constant.

The data in FIG. 5 reveal that as a tip's accumulated operating time increases (as it becomes more worn), the arc-time welding voltage increases, and the value of the tip replacement index increases. It was determined that a decision to replace the tip should be made when the index exceeds the decision threshold value A. The data in FIG. 6 show that as a tip's accumulated operating time increases, the average arc-time welding current decreases, and the value of the tip replacement index decreases. It was determined that a decision to replace the tip should be made when the value of the index falls below the decision threshold value B.

Figure 7:
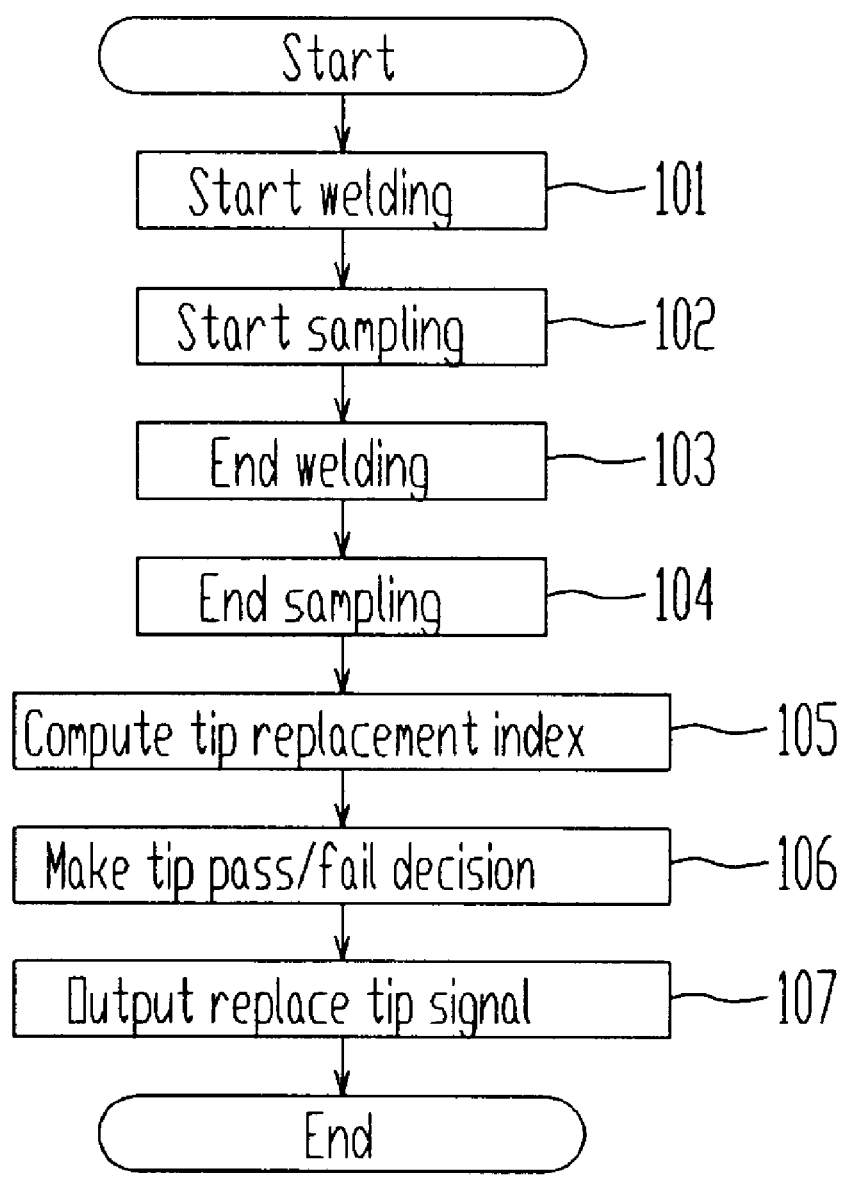
FIG. 7 is a simplified process flow chart for assessment of electrode tip wear.
Figure 8:
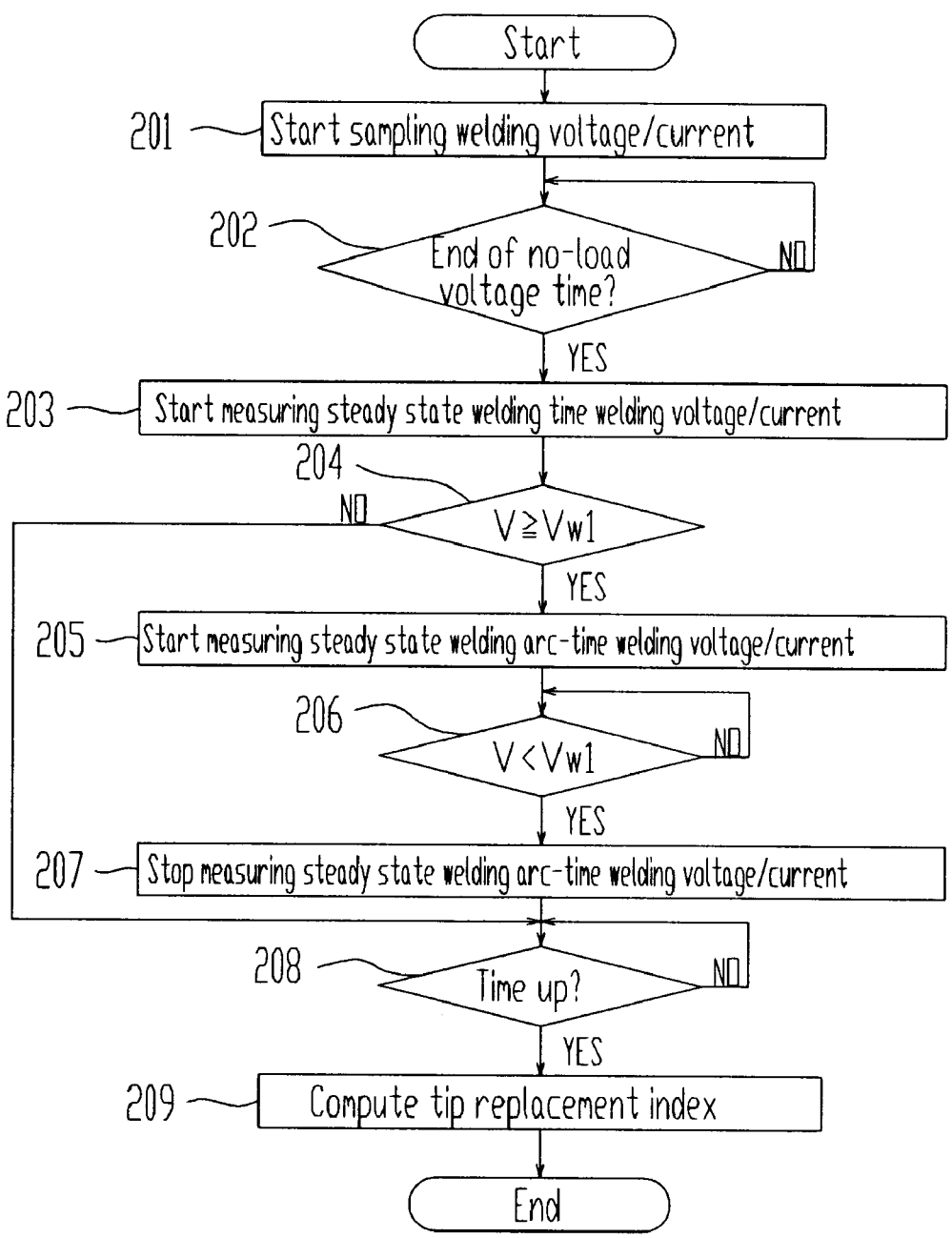
FIG. 8 is a detailed process flow chart for computation of tip replacement index.

The following description will refer to a simplified flow chart for an electrode tip wear assessment process, as shown in FIG. 7, and a detailed flow chart for a tip replacement index computation process, as shown in FIG. 8.

As shown in the simplified flow chart of FIG. 7, sampling is initiated by the start of arc welding (Steps 101 and 102) and ends when arc welding ends (Steps 103 and 104). In Step 105, the tip replacement index is computed as described above. In Step 106, the tip replacement index based on average arc-time welding voltage, or the tip replacement index based on average arc-time welding current is compared with its respective assessment threshold value (A or B) to make a tip wear pass/fail (tip wear acceptable or not acceptable) decision. If the tip replacement index has crossed the applicable assessment threshold value (A or B), an electrode tip replacement signal is output (Step 107).

The detailed flow chart of FIG. 8 starts in Step 201 by starting the welding voltage and welding current sampling process. In Step 202, execution waits for the end of the no-load voltage time (the time prior to the shorting of the wire 3 to the workpiece 6), after which measurement of welding voltage and welding current during the steady state welding time is begun (Step 203).

In Step 204, execution asks if the welding voltage V equals or exceeds the level $V_{W1}$ (See FIG. 3), which is the level above which arc-time welding voltage and arc-time welding current assessment can be performed. If it does, measurement of arc-time welding voltage and welding current during the steady state welding time begins (Step 205). As this measurement proceeds, execution repeatedly checks to see if V has fallen below the level of the assessment voltage $V_{W1}$ (Step 206). When V drops below $_{W1}$, measurement of arc-time welding voltage and welding current during the steady state welding time ends (Step 207). Next, in Step 208, execution asks if time is up (i.e., if has sampling time ended). If it has, a tip replacement index is computed, as described above (Step 209).

Back at step 204, if the welding voltage V had been less than the $V_{W1}$ reference level, execution would have gone to Step 208, bypassing Steps 205 through 207.

In the detailed flow chart of the tip replacement index computation process as shown in FIG. 8, two tip replacement indexes were computed: one based on average arc-time welding voltage, and the other based on average arc-time welding current. Actually, however, only one of these two indexes need be computed for comparison with the applicable assessment threshold, in order to make the electrode tip wear pass/fail decision.

Therefore, in FIGS. 1 and 4, either the welding voltage detection means 11 and the welding voltage detection circuit 31, or the welding current detection means 12 and the welding current detection circuit 32 may be omitted from the configuration.

According to the electrode tip wear assessment apparatus and assessment method of the present invention, as described above, it is possible to make a precise assessment of the optimum timing for replacement of electrode tips due to wear sustained during arc welding. Thus replacement of electrode tips before they have reached their limit of wear can be avoided. This will reduce welding system down time for tip replacement, and also prevent the occurrence of arc welding quality defects due to the use of electrode tips that have exceeded their wear limits.

The foregoing describes the preferred embodiment of the invention. A variety of modifications could be made, however, without deviating from the scope of the invention as defined by the following claims:

What is claimed is:

1. An apparatus for assessing electrode tip wear characterized in that, in consumable electrode gas-shielded arc welding, wherein welding voltage is applied to an electrode tip having a wire inserted therein in electrical contact therewith, for performing arc welding by causing droplets to be transferred from the welding wire onto a workpiece to be welded, it comprises:

a welding voltage detection means, or a welding current detection means, for detecting welding voltage applied between the welding wire and the workpiece, or welding current supplied;

a replacement index computation means for computing an electrode tip replacement index based on the average value of the arc-time welding voltage, or arc-time welding current, as detected by the welding voltage detection means or the welding current detection means; and a wear assessment means for assessing the state of wear of the electrode tip by comparing the replacement index computed by the replacement index computation means with a reference standard value.

2. A method for assessing electrode tip wear in consumable electrode gas-shielded arc welding, wherein a welding voltage is applied to an electrode tip having a wire inserted therein in electrical contact therewith, for performing arc welding by causing droplets to be transferred from the welding wire onto a workpiece to be welded, characterized in that it comprises:

a step of detecting either welding voltage applied between the welding wire and the workpiece, or welding current supplied;

a step of computing an electrode tip replacement index based on the quotient of the instant average arc-time welding voltage, or arc-time welding current, divided by the average arc-time welding voltage, or arc-time welding current, respectively, immediately following tip replacement; and a step of assessing the state of wear of the electrode tip by comparing the value of the replacement index computed by the replacement index computation means with a prescribed assessment threshold value.

* * * * *